April 17, 1951     M. E. MAKIN     2,549,320
WHEELED AXLE SUSPENSION
Filed July 5, 1949
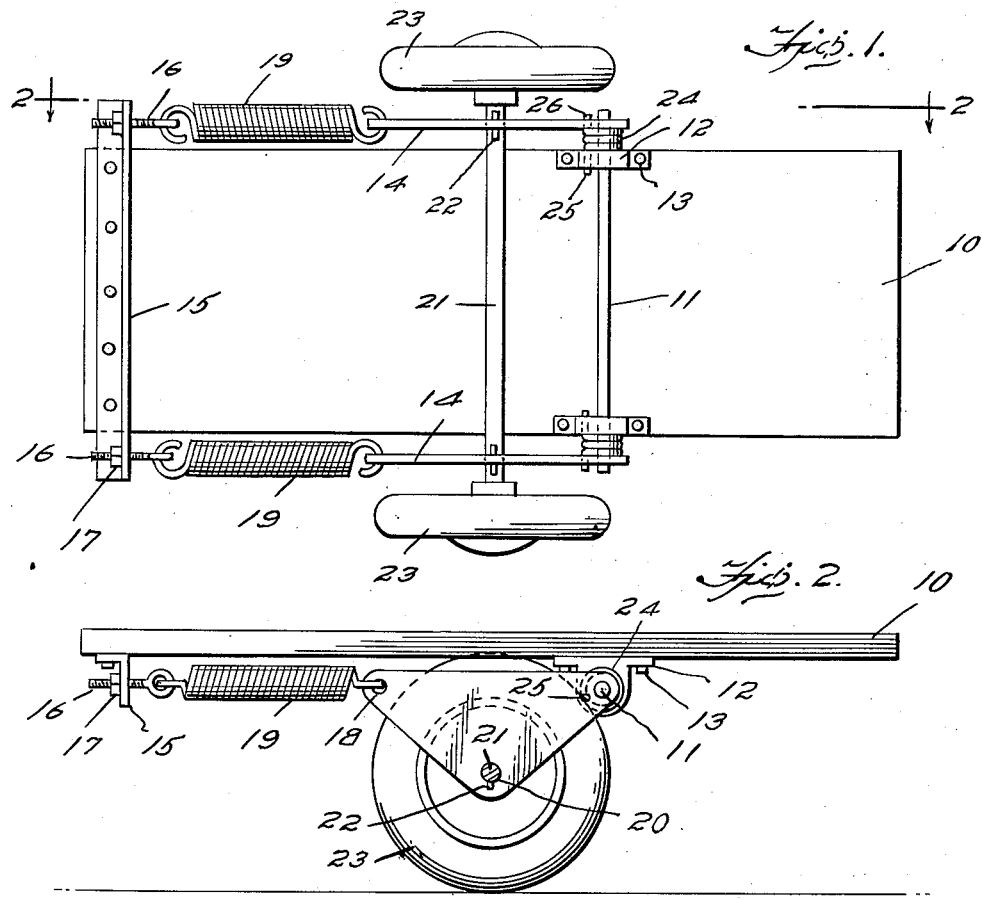
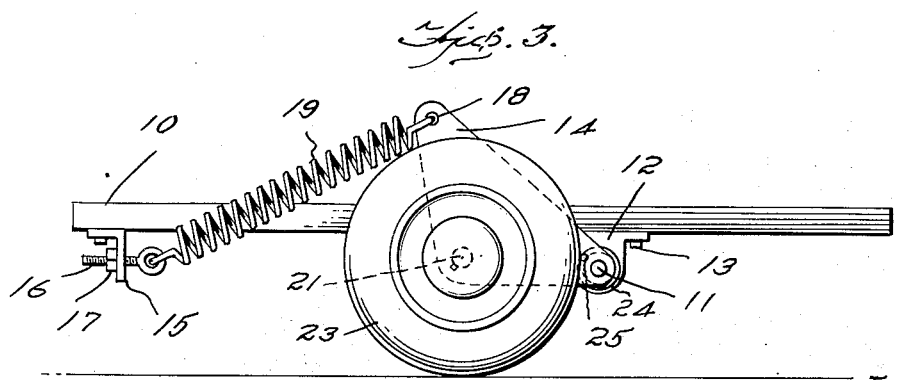
Inventor
Melfred E. Makin
By Wilfred Lawson
Attorney Patented Apr. 17, 1951

2,549,320

UNITED STATES PATENT OFFICE 2,549,320

WHEELED AXLE SUSPENSION

Melfred E. Makin, Ontario, Oreg.

Application July 5, 1949, Serial No. 103,139

1 Claim. (Cl. 267—20)

This invention relates to means for suspending a wheel axle underneath the bed of a vehicle body and the primary object of the invention is to provide a wheel axle suspension preventing any uneven laterally swaying movement of a vehicle bed under an unevenly distributed or shifting load.

Another object of the invention is to provide a wheel axle suspended underneath a vehicle bed by means of springs and assuring an even movement of the wagon bed relative to the axle even when one of said springs breaks or is accidentally disconnected.

The invention consists in the details of construction and in the combination and arrangement of the several parts of my improved means for suspending a wheel axle underneath the bed of a vehicle body whereby certain advantages are attained, as will be hereinafter more fully set forth.

In order that my invention may be better understood, I will now proceed to describe the same with reference to the accompanying drawings, wherein:

Figure 1 is a view in bottom plan of a wagon bed on the underside of which a wheel axle is secured in accordance with the present invention.

Figure 2 is a view in section taken on the line 2—2 of Figure 1 illustrating an embodiment of the invention in connection with an unloaded vehicle.

Figure 3 is a view similar to Figure 2 showing the arrangement of the several parts of the wheel axle suspension under the pressure of a load on the vehicle bed.

The wheel axle suspension as herein embodied is illustrated in the drawing as secured to the underside of a diagrammatically shown vehicle bed 10 and comprises a transverse shaft 11 supported by a pair of bearings 12 or the like secured to the underside of the wagon bed 10 adjacent to the longitudinal sides of said bed by means of bolts 13 or the like. The shaft 11 extends at both of its ends beyond the longitudinal sides of the vehicle bed 10. A bell crank 14, preferably having the shape of a triangular plate, is pivotally mounted at one of its base angles on each of the end portions of the transverse shaft 11. The bell crank plates are arranged so that their apexes point normally downward when they are secured in working position on an empty or unloaded vehicle bed 10.

An angle iron 15 is securely mounted on the under side of the vehicle bed 10 adjacent to one of the end edges of said bed and extends transversely across the bed and beyond the side edges thereof so that one of the flanges of the angle extends downwardly.

A ringbolt 16 extends through each of the end portions of this flange of the angle iron 15 projecting over the edges of the vehicle bed 10 and is adjustably secured by means of a nut 17.

A hole 18 is provided in the second base angle of each bell crank plate 14 and one end portion of a helical tension spring 19 extends through each of the holes 18 and is secured therein against accidental removal. The other end portion of each helical spring 19 is secured to the eye of the adjacent ring bolt 16. The tension of each helical spring 19 is adjusted by tightening or loosening the nut 17 on the ring bolts 16 so that the base of the bell crank plate 14 is arranged approximately parallel to the longitudinal margin of the underside of the vehicle bed 10 when the bed is unloaded.

In the apex angle of each bell crank plate 14 a hole 20 is provided and a wheel axle 21 extends through said holes transversely of the vehicle bed 10. The axle 21 is secured against rotary movement in the bell crank plates 14 in any conventional manner for instance by means of keys 22. The end portions of the axle 21 extend beyond the longitudinal sides of the vehicle bed 10 and on each end portion a wheel 23 is rotatably secured.

Between each bearing 12 and the adjacent bell crank plate 14 a helical spring 24 is located surrounding the transverse shaft 11. One of the end portions of each helical spring 24 is secured to the adjacent bearing 12, as at 25, and the other end portion to the adjacent bell crank plate 14, as at 26, so that the helical springs 24 urge the bell crank plates 14 into normal idle position.

When a load is placed on the vehicle bed 10 the shaft 11 secured to said bed is moved downwardly pivoting the bell crank plates 14 against the pressure of the springs 19 and 24 approximately in the position shown in Figure 3. The movement of the vehicle bed 10 will be even at both longitudinal sides of the bed and any tilting or lateral swaying of the bed is eliminated even when one of the springs should break or be disconnected. In this manner the danger of upsetting a vehicle caused by an unevenly distributed or shifting load is practically eliminated.

From the foregoing description it is thought to be obvious that a wheel axle suspension constructed in accordance with my invention is particularly well adapted for use by reason of the convenience and facility with which it may be assembled and operated.

I claim:

A wheel axle suspension of the class described comprising a transverse shaft rigidly mounted on the underside of the bed of a vehicle with its ends projecting beyond the sides thereof, a pair of triangular bell crank plates each pivotally mounted at one of its base corners on the projecting ends of said shaft, a pair of helical springs each having one of its ends secured to the vehicle bed and its other end to the second base corner of the adjacent bell crank plate, said springs being normally disposed parallel to the vehicle bed and in line with the base edges of said plates and the said shaft when the bed is without load, an axle rigidly mounted transversely of and in the downwardly pointing apex portions of the plates with the ends thereof projecting beyond the latter, and ground wheels mounted for rotation on the projecting ends of said axle.

MELFRED E. MAKIN.

REFERENCES CITED

The following references are of record in the file of this patent:

UNITED STATES PATENTS

| Number | Name | Date |
|---|---|---|
| 2,013,566 | Lumbers | Sept. 3, 1935 |
| 2,160,608 | Watson | May 30, 1939 |
| 2,184,188 | Hinshaw | Dec. 19, 1939 |

FOREIGN PATENTS

| Number | Country | Date |
|---|---|---|
| 636,972 | Germany | Oct. 20, 1936 |